April 10, 1928.
F. J. GLISKY
1,665,957
COLTER WHEEL STRUCTURE
Filed Sept. 8, 1927
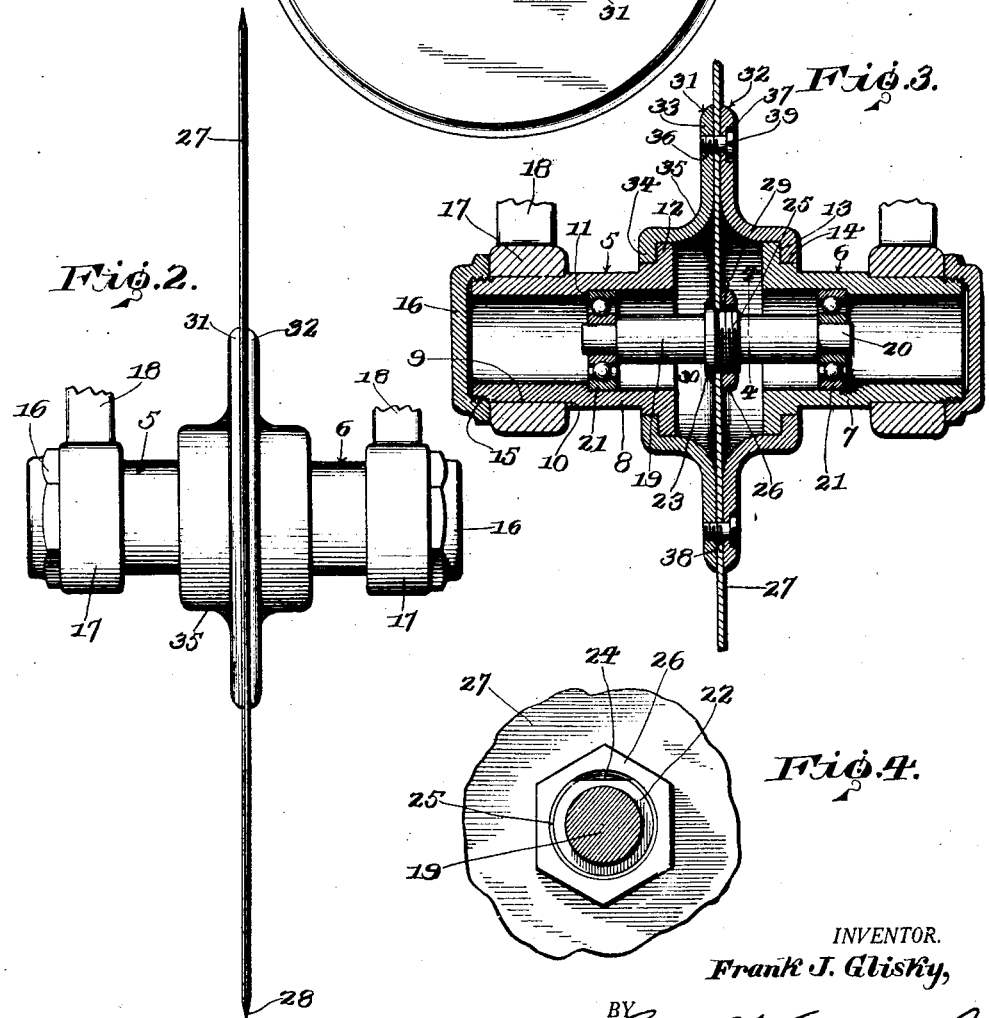
INVENTOR.
Frank J. Glisky,
BY
Geo. P. Kimmel
ATTORNEY.

Patented Apr. 10, 1928.

1,665,957

UNITED STATES PATENT OFFICE.

FRANK J. GLISKY, OF PONTIAC, MICHIGAN.

COLTER-WHEEL STRUCTURE.

Application filed September 8, 1927. Serial No. 218,305.

This invention relates to a colter wheel structure, and has for its object to provide, in a manner as hereinafter set forth, a structure of such class formed of a series of detachable elements capable of being readily assembled or disassembled when occasion requires.

A further object of the invention is to provide, in a manner as hereinafter set forth, a colter wheel structure formed of a series of detachable elements whereby when one becomes damaged or worn a new element can be substituted therefor without discarding the other elements of the structure.

A further object of the invention is to provide, in a manner as hereinafter set forth, a colter wheel structure including stationary and movable parts, and whereby these latter are continuously lubricated during the operation thereof.

A further object of the invention is to provide, in a manner as hereinafter set forth, a colter wheel structure including inner and outer bearing means for the wheel member and with said means being continuously lubricated during the travel of the wheel member.

A further object of the invention is to provide, in a manner as hereinafter set forth, a colter wheel structure including a hollow stationary hub means forming a lubricant reservoir and providing for the working parts of the structure to be continuously lubricated during the operation thereof.

A further object of the invention is to provide, in a manner as hereinafter set forth, a colter wheel structure including a wheel member and means to prevent lateral thrust on the latter during the travel thereof.

A further object of the invention is to provide, in a manner as hereinafter set forth, a colter wheel structure including inner and outer bearing means constructed and arranged to prevent weeds and stubble injuring or impairing the same when the wheel structure is active.

A further object of the invention is to provide, in a manner as hereinafter set forth, a colter wheel structure including a wheel member and a protected, rotatable shaft for the latter and with said shaft operating in protected, continuously lubricated bearings, and further with the shaft and its bearings constructed and arranged relative to a protecting means therefor to prevent lateral thrust of the shaft during the travel of the wheel member.

Further objects of the invention are to provide, in a manner as hereinafter set forth, a colter wheel structure which is simple in its construction and arrangement, strong, durable, compact, self lubricating, thoroughly efficient in its use, formed of a series of elements capable of being readily assembled and disassembled when required, constructed and arranged whereby wear on the working parts thereof is reduced to a minimum, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a colter wheel structure in accordance with this invention.

Figure 2 is a front elevation thereof.

Figure 3 is a longitudinal sectional view thereof.

Figure 4 is a section on line 4—4 Figure 3.

A colter wheel structure, in accordance with this invention, includes a stationary hub element formed of a pair of oppositely disposed tubular sections and as each of said sections is similar in construction, but one will be described, as the description of one will apply to the other. The sections of the hub element are arranged in opposed spaced relation and are indicated at 5, 6. Each section consists of a tubular body portion 7 of cylindrical cross section and of suitable inner and outer diameters. The body portion 7 is formed of two outer diameters, the largest of which is indicated at 8 and the smallest at 9 and which provides the outer face of the body portion 7 with an annular peripheral shoulder 10 positioned approximately centrally of the outer face of said body portion. That part of the body portion 7 of greatest outer diameter is the inner portion, and said portion 8 is of a greater inner diameter than the inner diameter of the portion 9, thereby providing the inner face of the body portion 7 with an annular shoulder 11, which is positioned inwardly of the shoulder 10 or in other words the shoulder 11 is positioned closer to the inner end of the body portion 7 than the shoulder 10. The inner end of the body portion 7 is formed with an outwardly projecting right angularly disposed flange 12, mortised on its outer face to form a shoulder 13 and a seat 14 both co-extensive with the body of the flange 12. The outer face of the body portion 7, at its outer end, is formed with peripheral threads 15. Detachably engaging with the threads 15 is an interiorly threaded, flanged closure cap 16 for the outer end of the body portion 7. The flanges 12 of the body portion 7 are arranged in opposed spaced relation.

Positioned on the sections 5, 6 are the annular ends 17 of the arms 18 of the colter yoke to which the colter wheel structure is to be collared to or connected. The annular ends 17 abut against the shoulder 10 and cap 16 whereby the sections 5, 6 are prevented from shifting relative to the yoke. Rotatably mounted within the sections 5, 6 and extending across the space formed between the inner ends of said sections, is a wheel member carrying shaft 19 having reduced terminals 20, each carrying a bearing device or element 21 which abuts against a shoulder 11. The shaft 19 centrally thereof is formed with an enlargement 22 provided at one end with an annular flange 23 and adjacent said flange 23, formed with a flat 24. The enlargement 22 is peripherally threaded as at 25 and the threads extend from one side to the other side of the flat 24. Co-acting with the threads 25 for the purpose of clamping the wheel member, to be presently referred to, against the flange 23, so that said member will be bodily carried with the shaft 19, which may be termed a bearing shaft, is a securing nut 26. The flat 24, in connection with the nut 26 forms a passage for supplying lubricant against the wheel member 27, and the latter is in the form of a circular disc having a tapered edge 28 and further formed with a centrally disposed opening 29 for the passage of the enlargement 22. The opening 29 is of less diameter than the diameter of the flange 23. The wheel member 27 extends through the space 30 formed between the opposed inner ends of the sections 5, 6 and said wheel member 27 is disposed centrally with respect to said space 30.

Associated with the wheel member 27, is a pair of combined coupling, bearing and closing members referred to generally by the reference characters 31, 32. The members 31, 32 are oppositely disposed with respect to each other and each is formed with an annular outer part 33 and an annular inner part 34, which in cross section is disposed in a plane parallel to the plane of the outer part 33 and is spaced therefrom. Each of said members further includes an outwardly curved intermediate part 35 which extends from the inner end of the part 33 and merges into the outer end of the part 34. In cross section the outer part 33 is of greater length than the inner part 34. The outer part 33 of the member 31 is formed with a plurality of openings 36 having threaded walls and the outer part 33 of the member 32 is formed with a plurality of countersunk openings 37 which align with the openings 36 when the members 31, 32 are in assembled position with respect to the wheel member 27, and the latter is formed with openings 38 arranged between and aligning with the openings 36, 37. The outer parts 33 of the members 31, 32 are positioned against the faces of the wheel member 27, and the intermediate parts 35 of said members 31, 32 are clear of the wheel member 27 and project outwardly therefrom in opposite directions and seat on the flanges 12. The parts 34 of the members 31, 32 bear against the shoulder 13 and seat 14. The members 31, 32 are secured to the wheel member 27 by countersunk holdfast devices 39 which have threaded engagement with the walls of the opening 36 and extend through the opening 37 and also through the opening 38. The members 31, 32 provide outer bearings for the wheel member 27 and the shaft 19, in connection with the devices 21, provides inner bearings for the wheel member 27. The members 31, 32 further provide means for coupling the wheel member 27 with the sections 5, 6 and also provide means for closing the space 30 formed between said sections 5, 6.

The sections 5, 6, in connection with the members 31, 32 provide a lubricant reservoir and by this arrangement the colter wheel structure is a self lubricating one. A cap 16 can be removed and lubricant supplied to the interior of the hub element. The shoulders 11 prevent end thrust with respect to the bearing shaft 16 and the flanges 12 prevent end thrust with respect to the members 31, 32 and therefore the wheel member 27 is prevented from a lateral shift or thrust during the operation of the colter wheel structure. The members 31, 32 revolve around the sections 5, 6 and owing to the shape of the intermediate parts 35 of said members the lubricant can pass between the inner faces of said parts 35 and the outer edge of the flanges 12.

The construction and arrangement of the device, permits it being readily assembled and disassembled when required and furthermore if an element or part thereof becomes damaged, it can be quickly removed and a new one substituted without discarding the entire structure.

The setting up of the structure, with the bearing surfaces formed by the flanges 12, shoulder 13 and seat 14 in connection with the arrangement of the bearing shaft 19 and bearing devices 21 insures a smooth, easy running of the wheel member 27 and reduces possibility of sticking thereof to a minimum. The colter wheel construction, in accordance with this invention, insures a cleaner cut furrow than that ordinarily obtained by colters now in use, because the wheel member 27 is so set up and connected as to prevent any possibility of wobbling thereof during its travel. As the colter wheel structure includes means for self lubricating the movable parts thereof it overcomes the necessity of constantly lubricating, as is the case now present in the colter wheels generally employed.

It is thought the many advantages of a colter wheel structure, in accordance with this invention, can be readily understood, and although the preferred embodiment of the invention is as illustrated and described, yet it is to be understood that changes in the details of construction can be had which fall within the scope of the invention as claimed.

What I claim is:

1. A colter wheel structure comprising a hub element formed of a pair of oppositely extending, opposed, spaced sections each provided with outer peripheral bearing surfaces at its inner end, a wheel member positioned between said sections, bearing devices arranged within said sections, a bearing shaft positioned within the sections and connected to said devices and to said wheel member, and a pair of oppositely disposed combined coupling, bearing and closure members connected to said wheel member exteriorly of said sections and revolubly mounted on said bearing surfaces.

2. A colter wheel structure comprising a hub element formed of a pair of oppositely extending, opposed, spaced sections each provided with outer peripheral bearing surfaces at its inner end, a wheel member positioned between said sections, bearing devices arranged within said sections, a bearing shaft positioned within the sections and connected to said devices and to said wheel member, and a pair of oppositely disposed combined coupling, bearing and closure members connected to said wheel member exteriorly of said sections and revolubly mounted on said bearing surfaces, said hub element in connection with said combined coupling, bearing and closure members providing a lubricant reservoir.

3. A colter wheel structure comprising a hub element formed of a pair of oppositely extending, opposed, spaced sections each provided with outer peripheral bearing surfaces at its inner end a wheel member positioned between said sections, bearing devices arranged within said sections, a bearing shaft positioned within the sections and connected to said devices and to said wheel member, and a pair of oppositely disposed combined coupling, bearing and closure members connected to said wheel member exteriorly of said sections and revolubly mounted on said bearing surfaces, said hub sections provided with means to prevent the lateral shift of said devices, shaft and combined coupling, bearing and closure members.

4. A colter wheel structure comprising a hub element formed of a pair of oppositely extending, opposed, spaced tubular sections each provided at its outer end with a removable closure cap, said sections forming a lubricant container, a revoluble wheel member positioned between said sections and projecting therefrom, an inner bearing means for said wheel member, said inner bearing means bridging the space between said sections and anchored from lateral shift within said sections, means for detachably connecting said inner bearing means to said wheel member, an outer bearing means for the wheel member revolving on the inner ends of said sections, means for connecting said outer bearing means to said wheel member, and said sections having their inner ends provided with means for connecting said outer bearing means therewith.

In testimony whereof, I affix my signature hereto.

FRANK J. GLISKY.